(12) United States Patent
Ireland et al.

(10) Patent No.: US 11,006,021 B1
(45) Date of Patent: May 11, 2021

(54) NON-COPY CORRELATION MARK

(71) Applicant: Xerox Corporation, Norwalk, CT (US)

(72) Inventors: Jonathan Ross Ireland, Lancaster, PA (US); Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/731,187

(22) Filed: Dec. 31, 2019

(51) Int. Cl.
  *H04N 1/40* (2006.01)
  *H04N 1/44* (2006.01)
  *H04N 1/32* (2006.01)

(52) U.S. Cl.
  CPC ....... *H04N 1/4446* (2013.01); *H04N 1/32144* (2013.01); *H04N 2201/327* (2013.01)

(58) Field of Classification Search
  CPC .................................................. H04N 1/4446
  See application file for complete search history.

(56) References Cited

U.S. PATENT DOCUMENTS

| | | | |
|---|---|---|---|
| 5,734,752 A | 3/1998 | Knox | |
| 7,894,626 B2 | 2/2011 | Wang et al. | |
| 9,471,846 B2 | 10/2016 | Fan et al. | |
| 9,614,995 B1 | 4/2017 | Chapman | |
| 9,961,230 B2 | 5/2018 | Eschbach et al. | |
| 10,452,964 B1 | 10/2019 | Chapman et al. | |
| 2004/0257625 A1* | 12/2004 | Tonami | G06K 15/02 358/3.28 |
| 2007/0264476 A1* | 11/2007 | Bala | B41M 3/144 428/195.1 |
| 2009/0060258 A1 | 3/2009 | Wang et al. | |
| 2009/0060261 A1 | 3/2009 | Wang | |
| 2009/0060262 A1* | 3/2009 | Wang | H04N 1/32309 382/100 |
| 2009/0122349 A1* | 5/2009 | Bala | H04N 1/32256 358/3.28 |
| 2009/0213430 A1* | 8/2009 | Wang | H04N 1/32203 358/3.2 |
| 2015/0271364 A1 | 9/2015 | Chapman et al. | |
| 2016/0096393 A1* | 4/2016 | Chapman | H04N 1/32144 283/73 |
| 2019/0297221 A1 | 9/2019 | Chapman | |

* cited by examiner

*Primary Examiner* — Dung D Tran
(74) *Attorney, Agent, or Firm* — Ortiz & Lopez, PLLC; Kermit D. Lopez; Luis M. Ortiz

(57) ABSTRACT

A method for rendering a correlation mark on a recording medium can involve encoding a pattern based on a correlation effect color based on a color recipe that includes a high density of one primary color and a mid-to-low density of at least one other primary color, and adjusting the pattern to ensure that the encoding is lost in a resulting rendering of a correlation mark embedded with the pattern. The pattern imposed on the correlation mark is not readily visible in an original without a decoding key. The correlation mark can include a frequency that is sufficiently high so that a copy of the correlation mark may not reproduce with the pattern.

20 Claims, 6 Drawing Sheets

NON-COPY CORRELATION MARK

TECHNICAL FIELD

Embodiments are related to printing devices and techniques. Embodiments further relate to security features such as watermarks. Embodiments are further related to correlation marks.

BACKGROUND

In conventional printing processes, requiring security measures, a pattern color space having specialty imaging characteristics has been utilized to provide the security measures and prevent counterfeiting of printed materials. In addition, in conventional printing processes, a pattern color space has been utilized, in part on variable data, such as printing logos, serial numbers, seat locations, or other types of unique identifying information on printed materials.

Security is an important requirement in many document production applications. In situations such as official or government document printing, event ticket printing, financial instrument printing and the like, many documents must be protected against copying, forging and/or counterfeiting. To do this, printed documents often include security marks or security features that serve to prevent counterfeiting and/or identify a document as original.

Thus, in security applications, it may be desirable to add information to a document in the form of a security mark or a security feature that may prevent or hinder alterations and counterfeiting. Specialty imaging has been used, conventionally, in printed materials to provide fraud protection and anti-counterfeiting measures for such security applications. Some examples are in prescriptions, contracts, documents, coupons, and tickets. Typically, several specialty imaging techniques are used at various positions in a document. In addition, these security elements may in some cases conflict with the overall aesthetics of the document.

A correlation mark is one example of a security mark or a security feature. A correlation mark can include one or more elements that are invisible or hardly visible on a printed document. The hidden elements can become visible when the document is viewed through a correlation mask that serves as a "key" to the correlation mark. When copying or scanning a document having a correlation mark, the correlation mark can survive and can still be decoded in the resulting copy.

Current "Correlation" or "CR" effects thus can "hide" information, making it visible only with a decoder sheet. These effects, however, can survive copying and reveal the hidden information in the resulting copies as well.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide a method and system for rendering an improved correlation mark.

It is another aspect of the disclosed embodiments to provide for a non-copy correlation mark.

The aforementioned aspects and other objectives and advantages can now be achieved as described herein. In an embodiment, a method for rendering a correlation mark on a recording medium, can involve encoding a pattern based on a correlation effect color based on a color recipe that includes a high density of one primary color and a mid-to-low density of at least one other primary color; and adjusting the pattern to ensure that the encoding is lost in a resulting rendering of a correlation mark embedded with the pattern.

An embodiment of the method can further involve rendering the correlation mark with at least one of: a copier, a printer or a scanner.

In an embodiment of the method, the pattern imposed on the correlation mark is not readily visible in the original without a decoding key.

In an embodiment of the method, the correlation mark can comprise a frequency that is sufficiently high so that a copy of the correlation mark can not reproduce with the pattern.

In an embodiment of the method, the color recipe can comprise a CMYK color recipe.

In an embodiment of the method, the correlation mark can comprise a frequency that is sufficiently high so that a copy of the correlation mark may not reproduce with the pattern, and the color recipe can comprise a CMYK color recipe.

In an embodiment of the method, the pattern imposed on the correlation mark is not readily visible without a decoding key; the correlation mark comprises a frequency that is sufficiently high so that a copy of the correlation mark may not reproduce with the pattern; and the color recipe comprises a CMYK color recipe.

In an embodiment, a system for rendering a correlation mark on a recording medium, can include at least one processor and a memory, the memory storing instructions to cause the at least one processor to perform: encoding a pattern based on a correlation effect color based on a color recipe that includes a high density of one primary color and a mid-to-low density of at least one other primary color; and adjusting the pattern to ensure that the encoding is lost in a resulting rendering of a correlation mark embedded with the pattern.

In an embodiment of the system, the instructions can further comprise instructions for performing: rending the correlation mark with at least one of: a copier, a printer or a scanner.

In an embodiment of the system, the pattern imposed on the correlation mark is not readily visible in the original without a decoding key.

In an embodiment of the system, the correlation mark can comprise a frequency that is sufficiently high so that a copy of the correlation mark may not reproduce with the pattern.

In an embodiment of the system, the color recipe can comprise a CMYK color recipe.

In an embodiment of the system, the correlation mark can comprise a frequency that is sufficiently high so that a copy of the correlation mark may not reproduce with the pattern; and the color recipe can comprise a CMYK color recipe.

In an embodiment of the system, the pattern imposed on the correlation mark is not readily visible with a decoding key; the correlation mark comprises a frequency that is sufficiently high so that a copy of the correlation mark may not reproduce with the pattern; and the color recipe comprises a CMYK color recipe.

In another embodiment, a system can include a computerized device adapted to receive a printable electronic document; a printing device in communications with the computerized device, wherein before rendering by the printing device, the computerized device: encodes a pattern based on a correlation effect color based on a color recipe that includes a high density of one primary color and a mid-to-low density of at least one other primary color; and applies a modulation transfer function to the pattern to ensure that the encoding is lost in a resulting rendering by the printing device of a correlation mark embedded with the pattern on the printable electronic document.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
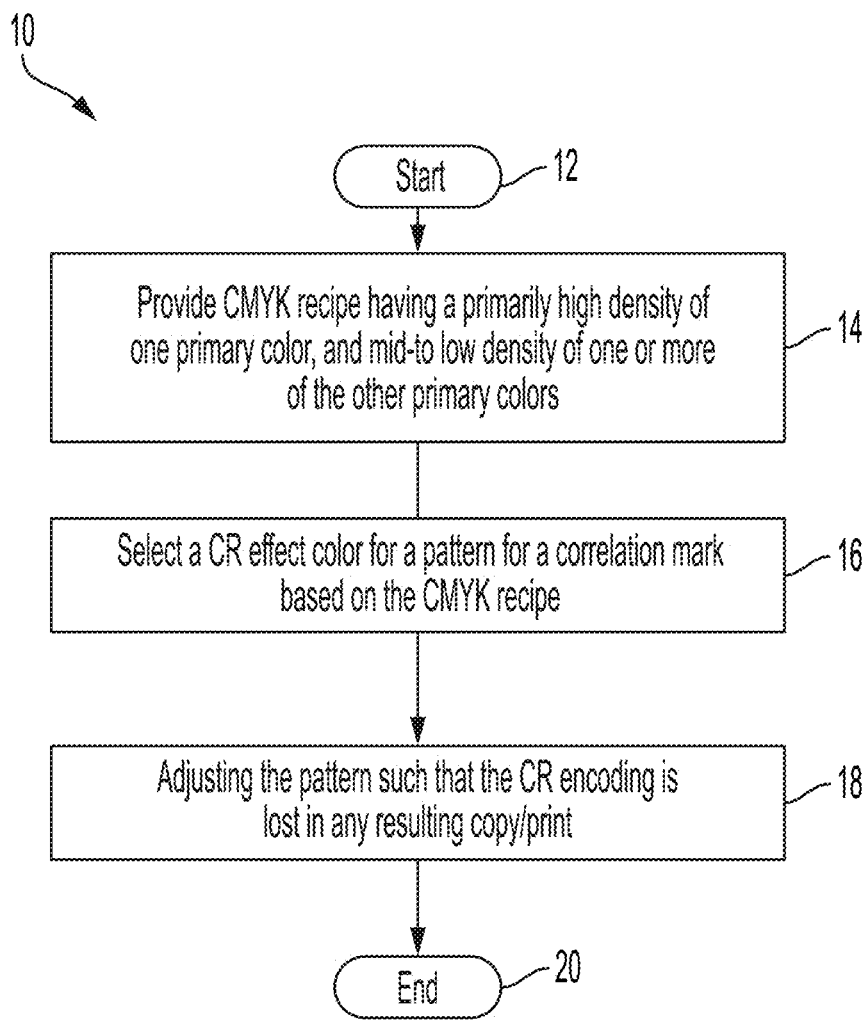
FIG. 1 illustrates a flow chart of operations depicting logical operational steps of a method for rendering a correlation mark, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The term "data" refers herein to physical signals that indicate or include information. An "image," as a pattern of physical light or a collection of data representing the physical light, may include characters, words, and text as well as other features such as graphics.

A "digital image" is by extension an image represented by a collection of digital data. An image may be divided into "segments," each of which is itself an image. A segment of an image may be of any size up to and including the whole image.

The term "image object" or "object" as used herein is believed to be considered in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An operation can perform "image processing" when it operates on an item of data that relates to part of an image.

"Contrast" can be used to denote the visual difference between items, data points, and the like. It can be measured as a color difference or as a luminance difference or both.

A digital color printing system can be an apparatus arrangement suited to accepting image data and rendering that image data upon a substrate.

The "RGB color model" can be an additive color model in which red, green, and blue can be added together in various ways to reproduce a broad array of colors. The name of the model comes from the initials of the three additive primary colors, red, green, and blue.

A primary purpose of the RGB color model can be for the sensing, representation, and display of images in electronic systems. RGB is a device-dependent color model: different devices detect or reproduce a given RGB value differently, since the color elements and their response to the individual R, G, and B levels vary from manufacturer to manufacturer, or even in the same device over time. Thus, an RGB value may not define the same color across devices without some kind of color management.

The "CMYK color model" can be a subtractive color model, which can be used in color printing, and can also be used to describe the printing process itself. CMYK refers to the four inks used in some color printing: cyan, magenta, yellow, and black.

"Colorant" can refer to one of the fundamental subtractive C, M, Y, K, primaries, which may be realized in formulation as, liquid ink, solid ink, dye, or electrostatographic toner. A "colorant mixture" can be a particular combination of C, M, Y, K colorants. The term "colorant" can be utilized herein to relate to colorants such an ink or a toner, including but not limited to a color ink and a toner blend.

A "security feature" can relate to an authenticating mark on media for verifying or authorizing the media or for demonstrating the authenticity of the media. An example of a security feature is a watermark.

A "watermark" can relate to identifying an image or a pattern in media (e.g. paper) that appears as various shades of lightness/darkness when viewed by transmitted light (or when viewed by reflected light, atop a dark background), caused by thickness or density variations in the paper. Watermarks have been used on ticket, postage stamps, currency, and other government documents to discourage counterfeiting. Watermarks vary greatly in their visibility; while some may be obvious on casual inspection, others may require some study to pick out. A watermark is very useful in the examination of paper because it can be used for dating, identifying sizes, mill trademarks and locations, and determining the quality of a sheet of paper. The term "watermark" as utilized herein can also relate to digital practices that share similarities with physical watermarks. For example, overprint on computer-printed output may be used to identify output from an unlicensed trial version of a computer program. In another example, identifying codes can be encoded as a digital watermark for a music file, a video file, an image file or another type of digital file.

An "infrared mark" can be a type of watermark embedded in the image that has the property of being relatively indecipherable under normal light, and yet decipherable under infrared illumination by appropriate infrared sensing devices, such as infrared cameras.

"Metameric" rendering/printing is the ability to use multiple colorant combinations to render a single visual color, as can be achieved when printing with more than three colorants.

FIG. 1 illustrates a flow chart of operations depicting logical operational steps of a method 10 for rendering a correlation mark, in accordance with an embodiment. As indicated at block 12, the process can be initiated. Thereafter, as shown at block 14, a step or operation can be implemented in which a CMYK recipe is provided or configured having a primarily high density of one primary color, and a mid-to-low density of one or more of the other primary colors. Next, as shown at block 16, a step or operation can be implemented in which a CR effect color can be selected based on the CMYK recipe. Thereafter, as depicted at block 18, a step or operation can be implemented to adjust the pattern such that the CR encoding is lost in the resulting copy/print. The process can then end, as depicted at block 20.

Note that some embodiments may involve the use of an MTF (Modulation Transfer Function). That is, the MTF is what happens inside, for example, a scanner/copier, and what can cause the hidden message to break/disappear. An example embodiment can involve performing an MTF/copy/scan step in validating proposed recipes and testing one or the other possible CMYK recipes for strength of effect, but may not be actually used in creating the effect.

Note that other color variations may be possible with further testing. Some copier settings can remove the pattern more completely than others, but none may preserve it well enough to pass as the original. An example of a rendering device that can be utilized to implement the method 10 is the printing system 100 shown in FIG. 3 and the DFE controller 200 depicted in FIG. 4.

The method 10 shown in FIG. 1 can thus provide a technique for making correlation marks that are difficult to copy. This type of correlation mark can be referred to as a non-copy correlation mark. The copy may not preserve the information embedded in the correlation marks, but also may not be easily visible so that the person making the copy may not automatically be aware that the copy does not contain the information imbedded in the correlation marks. The method 10 can involve using colors with a high density of one primary and low density of one or more of the other primaries. The aforementioned pattern imposed for the correlation mark may not be readily visible with a decoding key. The correlation mark can contain a high enough frequency so that a copy may not reproduce the embedded pattern. The method 10 can thus implement correlation marks that may not be copied, but also which may not alert the person making the copy that the copy does reproduce the correlation marks.

Figure 2:
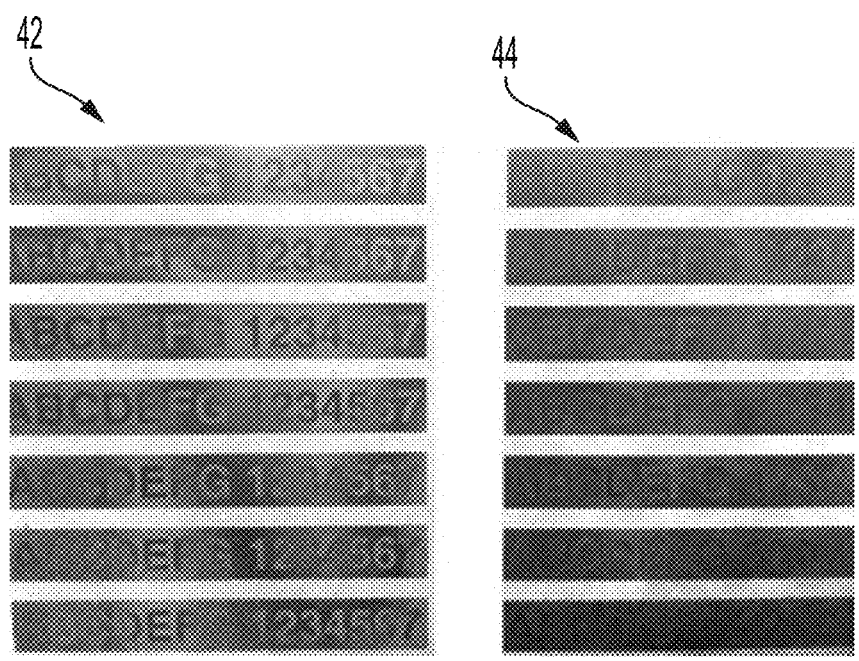
FIG. 2 illustrates images demonstrating a non-copy correlation mark with the original shown on the left with a copy on the right and a decoder sheet located on top of both documents, in accordance with an embodiment.

FIG. 2 illustrates images of rendered media demonstrating the non-copy correlation mark, in accordance with an embodiment. In FIG. 2, an image 42 is shown on the left and an image 44 on the right. The image 42 shown at the left side of FIG. 2 is an original document and the image 44 shown on the right is a copy of the original document. Thus, the original is shown on the left with the copy on the right and a decoder sheet is located on top of both documents.

FIG. 2 thus depicts the original and copy as noted. The CMYK values in the lower density where the dots become smaller and sparser are the ones that can be filtered out. This can extend to, for example, systems with more than 4 colors, for example a CMYK+VO (violet or orange) or CMYK+ other spot colors (but not "clear").

Figure 3:
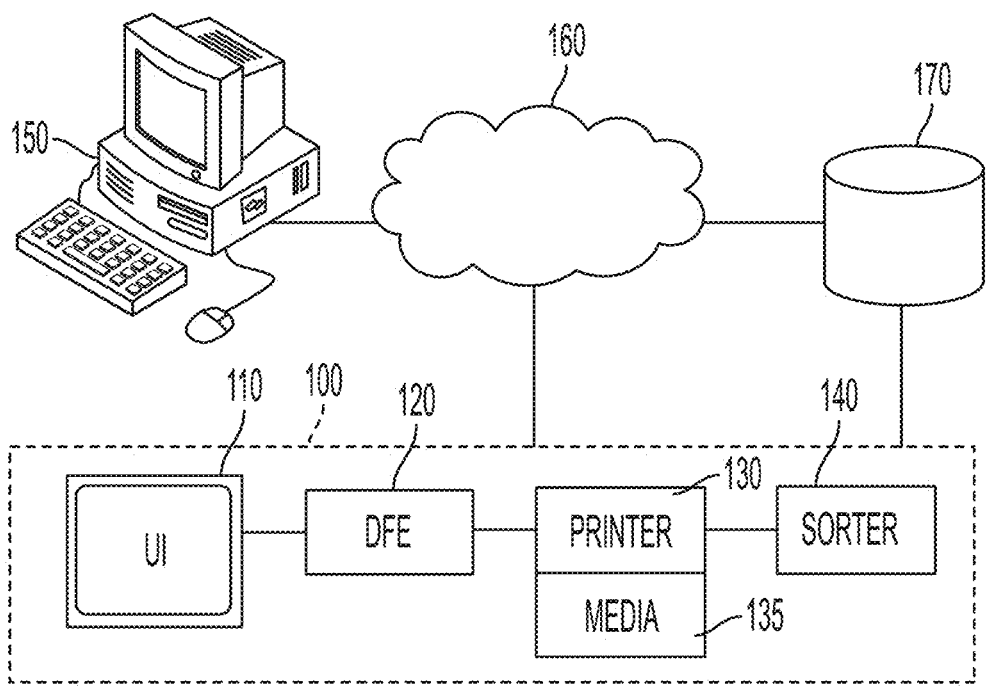
FIG. 3 illustrates a block diagram of a printing system suitable for implementing one or more of the disclosed embodiments.

With reference to FIG. 3, a printing system (or image rendering system) 100 suitable for implementing various aspects of the exemplary embodiments described herein is illustrated.

The word "printer" and the term "printing system" as used herein encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine and which may perform a print outputting function for any purpose.

The printing system 100 can include a user interface 110, a digital front end (DFE) controller 120, and at least one print engine 130. The print engine 130 has access to print media 135 of various sizes and cost for a print job. The printing system 100 can comprise a color printer having multiple color marking materials.

A "print job" or "document" is normally a set of related sheets, usually one or more collated copy sets copied from a set of original print job sheets or electronic document page images, from a particular user, or otherwise related. For submission of a regular print job (or customer job), digital data is generally sent to the printing system 100.

A sorter 140 can operate after a job is printed by the print engine 130 to manage arrangement of the hard copy output, including cutting functions. A user can access and operate the printing system 100 using the user interface 110 or via a data-processing system such as a workstation 150. The workstation 150 can communicate bidirectionally with the printing system 100 via a communications network 160.

A user profile, a work product for printing, a media library, and various print job parameters can be stored in a database or memory 170 accessible by the workstation 150 or the printing system 100 via the network 160, or such data can be directly accessed via the printing system 100. One or more color sensors (not shown) may be embedded in the printer paper path, as known in the art.

Figure 4:
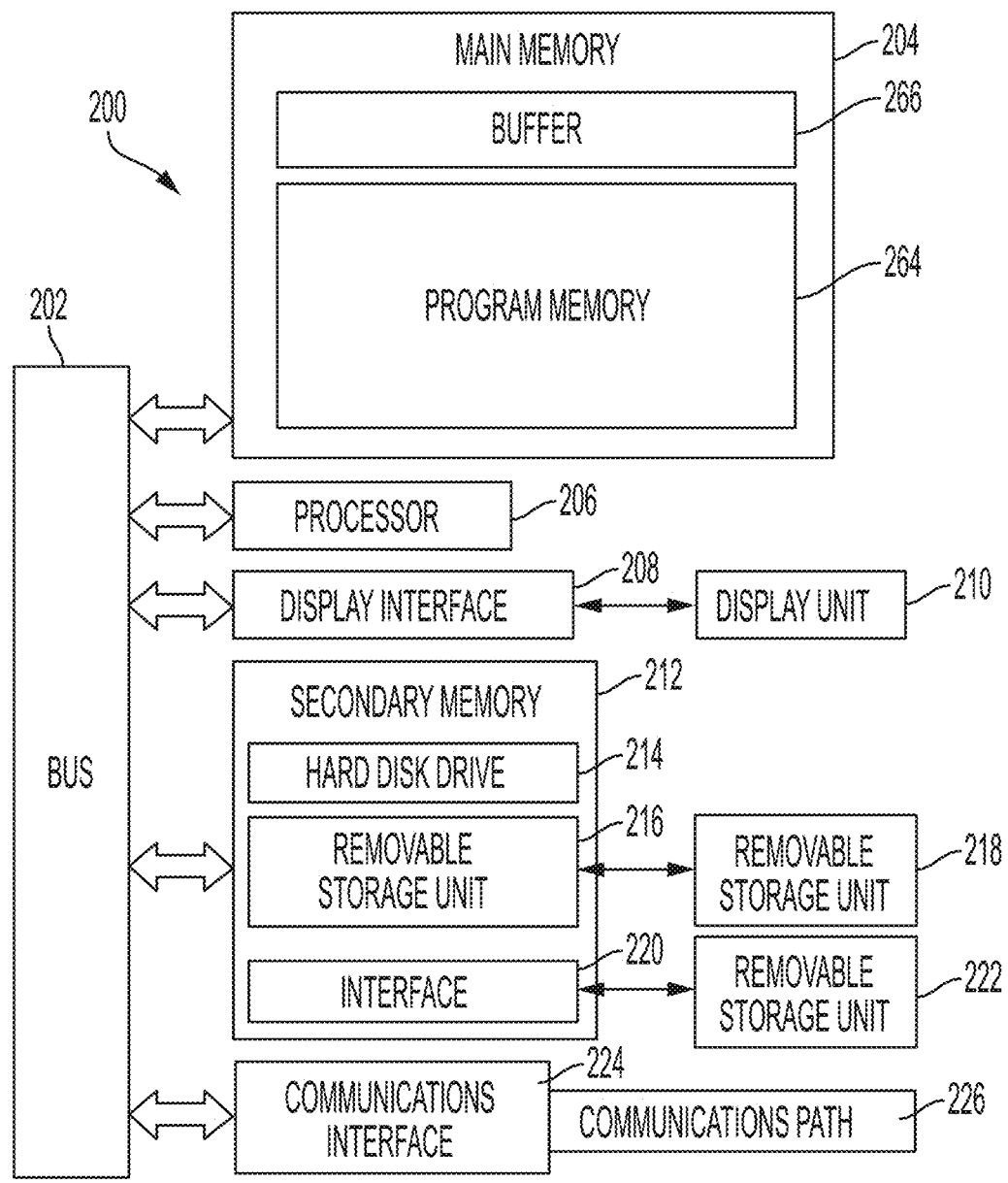
FIG. 4 illustrates a block diagram of a digital front end controller useful for implementing one or more of the disclosed embodiments.

With respect to FIG. 4, an exemplary DFE (Digital Front End) controller 200 is shown in greater detail. The DFE controller 200 can include one or more processors, such as processor 206 capable of executing machine executable program instructions. The processor 206 can function as a DFE processor.

In the embodiment shown, the processor 206 can be in communication with a bus 202 (e.g., a backplane interface bus, cross-over bar, or data network). The digital front end 200 can also include a main memory 204 that is used to store machine readable instructions. The main memory 204 is also capable of storing data. The main memory 204 may alternatively include random access memory (RAM) to support reprogramming and flexible data storage. A buffer 266 can be used to temporarily store data for access by the processor 206.

Program memory 264 can include, for example, executable programs that implement the embodiments of the methods described herein. The program memory 264 can store at least a subset of the data contained in the buffer. The digital front end 200 can include a display interface 208 that forwards data from communication bus 202 (or from a frame buffer not shown) to a display 210. The digital front end 200 can also include a secondary memory 212 includes, for example, a hard disk drive 214 and/or a removable storage drive 216, which reads and writes to removable storage 218, such as a floppy disk, magnetic tape, optical disk, etc., that stores computer software and/or data.

The secondary memory 212 alternatively may include other similar mechanisms for allowing computer programs or other instructions to be loaded into the computer system. Such mechanisms can include, for example, a removable storage unit 222 adapted to exchange data through interface 220. Examples of such mechanisms include a program cartridge and cartridge interface (such as that found in video game devices), a removable memory chip (such as an EPROM, or PROM) and associated socket, and other removable units and interfaces, which allow software and data to be transferred.

The digital front end 200 can include a communications interface 224, which acts as both an input and an output to allow software and data to be transferred between the digital front end 200 and external devices. Examples of a communications interface include a modem, a network interface (such as an Ethernet card), a communications port, a PCM-CIA slot and card, etc.

Computer programs (also called computer control logic) and including one or more modules may be stored in the main memory 204 and/or the secondary memory 212. Computer programs or modules may also be received via a communications interface 224. Such computer programs or modules, when executed, enable the computer system to perform the features and capabilities provided herein. Software and data transferred via the communications interface can be in the form of signals which may be, for example, electronic, electromagnetic, optical, or other signals capable of being received by a communications interface.

These signals can be provided to a communications interface via a communications path (i.e., channel), which carries signals and may be implemented using wire, cable, and fiber optic, phone line, cellular link, RF, or other communications channels.

Part of the data generally stored in secondary memory 212 for access during an DFE operation may be a set of translation tables that can convert an incoming color signal into a physical machine signal.

This color signal can be expressed either as a colorimetric value; usually three components as L*a*b*, RGB, XYZ, etc.; into physical exposure signals for the four toners cyan, magenta, yellow and black. These tables can be created outside of the DFE and downloaded, but may be optionally created inside the DFE in a so-called characterization step.

Figure 5:
FIG. 5 illustrates an image of a copy with a key, in accordance with an embodiment.
Figure 6:
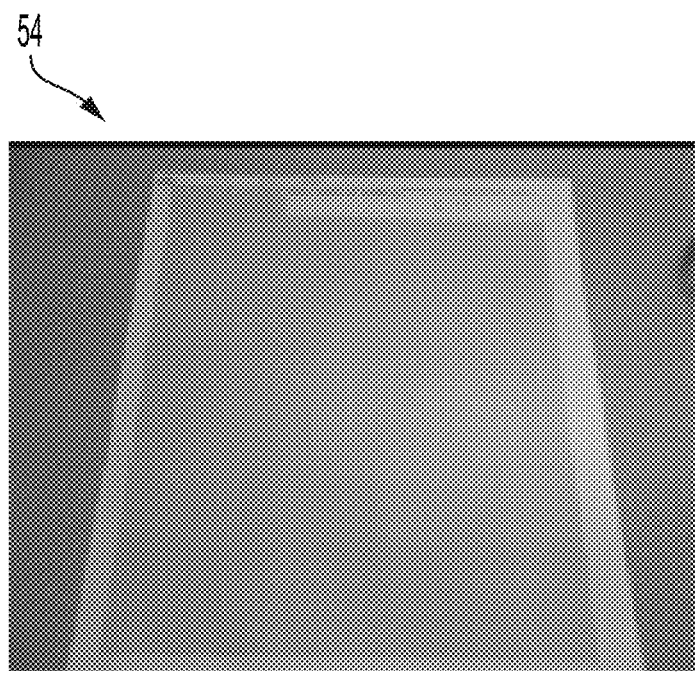
FIG. 6 illustrates an image of a copy without a key, in accordance with an embodiment.
Figure 7:
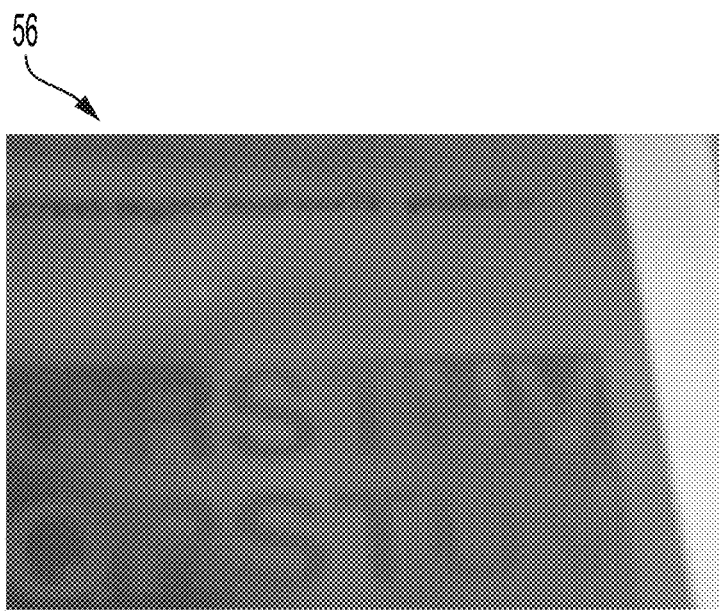
FIG. 7 illustrates an image of an original with a key, in accordance with an embodiment.
Figure 8:
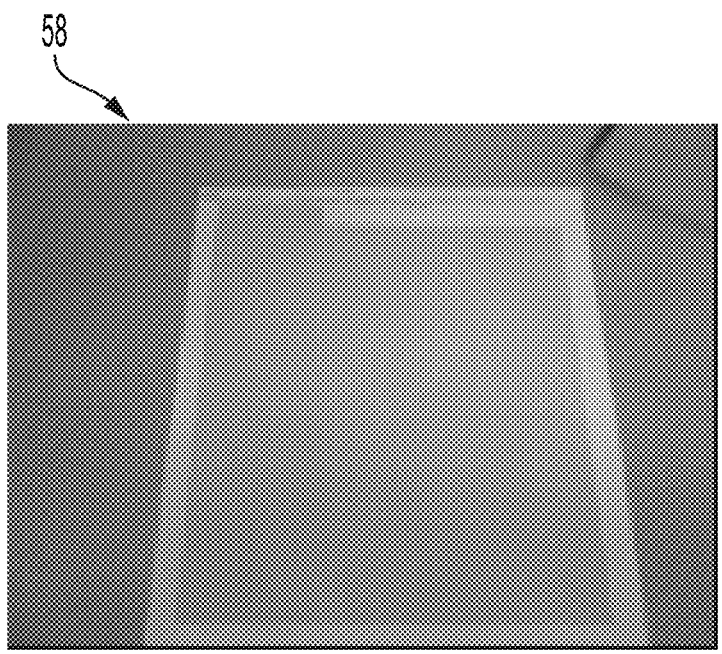
FIG. 8 illustrates an image of an original without a key, in accordance with an example embodiment.

Not that FIG. 5, FIG. 6, FIG. 7, and FIG. 8 depict examples (images) of correlation mark print and copies, wherein the effect with the key is still there. Thus, FIG. 5 illustrates an image 52 of a copy with a key, in accordance with an embodiment. FIG. 6 illustrates an image 54 of a copy without a key, in accordance with an embodiment. FIG. 7 illustrates an image 56 of an original with a key, in accordance with an embodiment. FIG. 8 illustrates an image 58 of an original without a key, in accordance with an example embodiment.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

The disclosed example embodiments are described at least in part herein with reference to flowchart illustrations and/or block diagrams and/or schematic diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams depicted and described herein can represent a module, segment, or portion of instructions, which can comprise one or more executable instructions for implementing the specified logical function(s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of such modules according to the approach described herein can lead to improvements in processing speed and in energy savings and efficiencies in a data-processing system such as, for example, the printing system 100 shown in FIG. 3 and/or the DFE controller 200 shown in FIG. 4. A "module" can perform the various steps, operations or instructions discussed herein, such as the steps or operations discussed herein with respect to FIG. 1 and FIG. 2.

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. Such improvements can result from implementations of the disclosed embodiments. The claimed solution may be rooted in computer technology in order to overcome a problem specifically arising in the realm of computers, computer networks and call center platforms.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for rendering a correlation mark on a recording medium, comprising:
    embedding a pattern in a correlation mark based on a correlation effect color based on a color recipe that includes a high density of one primary color and a mid-to-low density of at least one other primary color; and
    interacting a modular transfer function with the pattern to ensure that correlation encoding is lost in a resulting rendering of the correlation mark embedded with the pattern.

2. The method of claim 1 further comprising rendering the correlation mark with at least one of: a copier, a printer or a scanner.

3. The method of claim 1 wherein the pattern imposed on the correlation mark is not readily visible in an original without a decoding key.

4. The method of claim 1 wherein the correlation mark comprises a frequency that is sufficiently high so that a copy of the correlation mark does not reproduce with the pattern.

5. The method of claim 1 wherein the color recipe comprises a CMYK color recipe.

6. The method of claim 1 wherein:
    the correlation mark comprises a frequency that is sufficiently high so that a copy of the correlation mark does not reproduce with the pattern; and
    the color recipe comprises a CMYK color recipe.

7. The method of claim 1 wherein:
    the pattern imposed on the correlation mark is not readily visible in an original without a decoding key;
    the correlation mark comprises a frequency that is sufficiently high so that a copy of the correlation mark does not reproduce with the pattern; and
    the color recipe comprises a CMYK color recipe.

8. A system for rendering a correlation mark on a recording medium, comprising:
    at least one processor and a memory, the memory storing instructions to cause the at least one processor to perform:
        embedding a pattern in a correlation mark based on a correlation effect color based on a color recipe that includes a high density of one primary color and a mid-to-low density of at least one other primary color; and
        interacting a modular transfer function with the pattern to ensure that correlation encoding is lost in a resulting rendering of the correlation mark embedded with the pattern.

9. The system of claim 8 wherein the instructions further comprise instructions for performing: rending the correlation mark with at least one of: a copier, a printer or a scanner.

10. The system of claim 8 wherein the pattern imposed on the correlation mark is not readily visible in an original without a decoding key.

11. The system of claim 8 wherein the correlation mark comprises a frequency that is sufficiently high so that a copy of the correlation mark does not reproduce with the pattern.

12. The system of claim 8 wherein the color recipe comprises a CMYK color recipe.

13. The system of claim 8 wherein:
    the correlation mark comprises a frequency that is sufficiently high so that a copy of the correlation mark does not reproduce with the pattern; and
    the color recipe comprises a CMYK color recipe.

14. The system of claim 8 wherein:
    the pattern imposed on the correlation mark is not readily visible in an original without a decoding key;
    the correlation mark comprises a frequency that is sufficiently high so that a copy of the correlation mark does not reproduce with the pattern; and
    the color recipe comprises a CMYK color recipe.

15. A system, comprising:
    a computerized device adapted to receive a printable electronic document;
    a printing device in communications with the computerized device,
    wherein before rendering by the printing device, the computerized device:
        embeds a pattern in a correlation mark based on a correlation effect color based on a color recipe that includes a high density of one primary color and a mid-to-low density of at least one other primary color; and
        interacts a modular transfer function with the pattern to ensure that correlation encoding is lost in a resulting rendering of the correlation mark embedded with the pattern.

16. The system of claim 15 wherein the correlation mark is rendered with the printing device, the printing device comprising at least one of: a copier, a printer or a scanner.

17. The system of claim 15 wherein the pattern imposed on the correlation mark is not readily visible in an original without a decoding key.

18. The system of claim 15 wherein the correlation mark comprises a frequency that is sufficiently high so that a copy of the correlation mark does not reproduce with the pattern.

19. The system of claim 15 wherein the color recipe comprises a CMYK color recipe.

20. The system of claim 15 wherein:
    the correlation mark comprises a frequency that is sufficiently high so that a copy of the correlation mark does not reproduce with the pattern; and the color recipe comprises a CMYK color recipe.

* * * * *